Patented Apr. 24, 1945

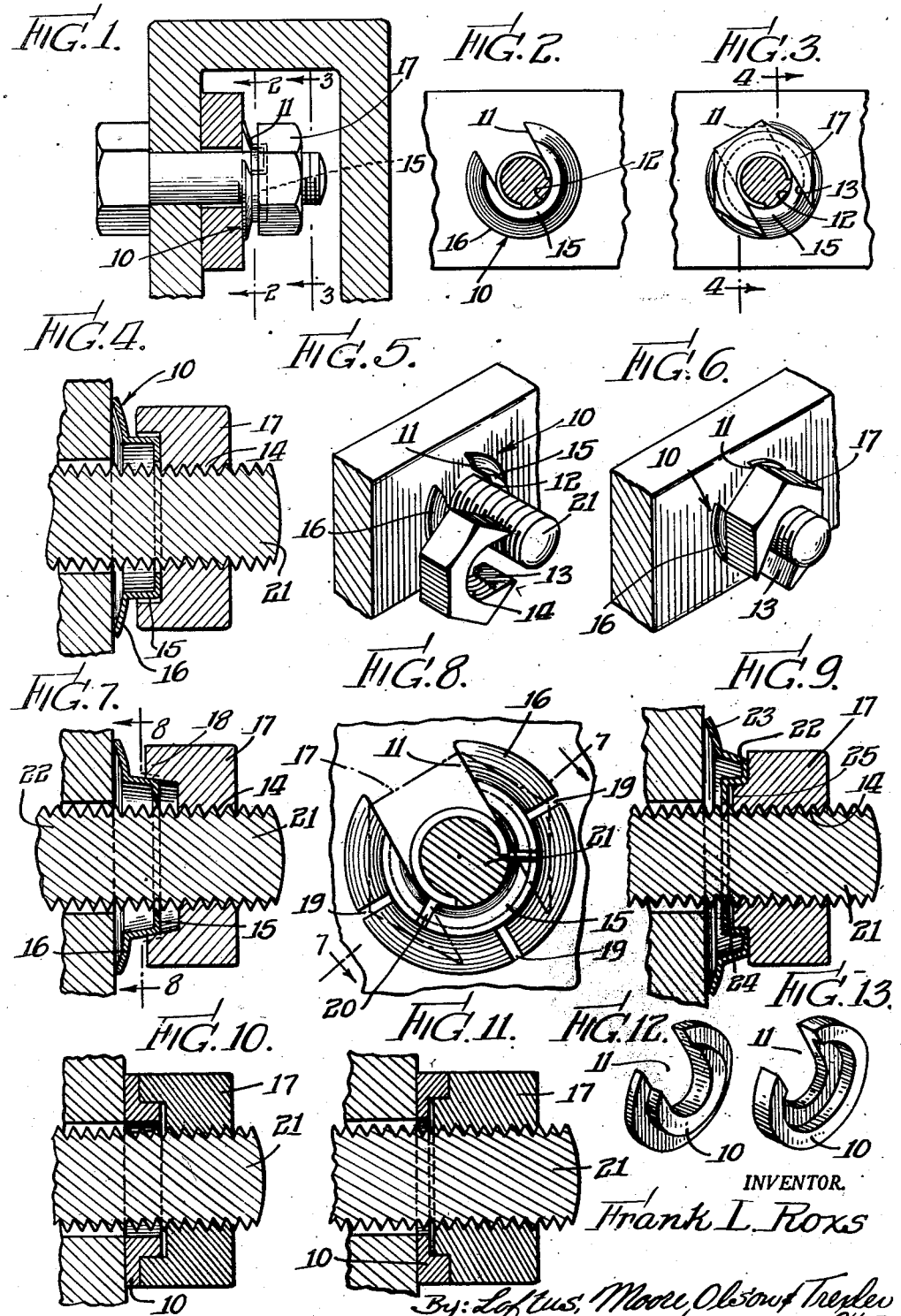

2,374,309

UNITED STATES PATENT OFFICE 2,374,309

SLIP-ON INTERLOCKING WASHER AND NUT SECURING DEVICE

Frank L. Roxs, Evanston, Ill.

Application March 25, 1943, Serial No. 480,428

2 Claims. (Cl. 85—32)

It is an object of my invention to provide a slip-on interlocking washer and nut securing device adapted to be slipped transversely onto a screw-threaded bolt, shaft, bar, or the like, and readily and quickly secured in place thereon.

It is a further object to provide such a device which may be readily and quickly applied and secured in place on a bolt or shaft without passing it over either end thereof.

It is a further object to provide such a device having in combination a resilient slip-on washer and a rigid slip-on nut so arranged and constructed as to intermesh with each other when secured in place for their intended use.

It is a further object to provide such a device having a resilient slip-on washer and rigid slip-on nut so fashioned and arranged that when the nut is screwed home, it interlocks with the washer, and the washer, in turn, is caused to intermesh with the threads of the bolt on which the device is mounted.

The above objects and advantages will become apparent from a detailed description of the accompanying drawing in which we have illustrated a combined slip-on washer and nut so fashioned as to intermesh with each other when secured in place, embodying certain forms of my invention, but the constructions there shown are, however, to be understood as illustrative and not as defining the limits of my invention.

In the drawing,

Fig. 1 is an elevational view of a bolt in place in a mounting which does not permit room to position a nut over the end of the bolt, and showing my improved slip-on combination washer and slip-on nut in position in intermeshing relation.

Fig. 2 is a plan view of the slip-on washer shown in Fig. 1, taken on the line 2—2 of Fig. 1.

Fig. 3 is an elevational view, taken on the line 3—3 of Fig. 1.

Fig. 4 is a sectional view taken on the line 4—4 of Fig. 3.

Fig. 5 is a perspective view showing the slip-on resilient washer in position on a screw-threaded bolt with the slip-on nut about to be applied.

Fig. 6 is a perspective view showing my device applied.

Fig. 7 is a sectional view taken on the line 7—7 of Fig. 8.

Fig. 8 is a sectional view taken on the line 8—8 of Fig. 7, showing the plurality of slots and peripheral flange and body portion of the washer.

Fig. 9 is a sectional view showing a modified form of the resilient washer and rigid slip-on nut.

Fig. 10 shows a male rigid slip-on washer and a rigid slip-on female nut.

Fig. 11 shows a female rigid slip-on washer and a rigid male nut.

Fig. 12 is a perspective view of the rigid washer shown in Fig. 10.

Fig. 13 is a perspective view of the rigid washer shown in Fig. 11.

Referring to the drawing in detail, broadly speaking, my securing device comprises in combination a slip-on washer and an interiorly screw-threaded slip-on nut, each provided with an open slot extending substantially from their centers to their outer periphery, so arranged and fashioned that when the parts are secured in place on a screw-threaded bolt, shaft, or the like, the parts are secured in place in intermeshing relation with each other. In the particular form shown in Figs. 1 to 9 inclusive, the washer is constructed by a stamping operation of flat, resilient material, and when formed with its resilient peripheral flange and axially extending body portion, it is of a highly resilient character.

In the particular form shown in Figs. 1 to 8 inclusive, it is so constructed as to provide a male washer while the rigid slip-on nut is of the female type.

In Fig. 9, the resilient washer is formed in the same manner to provide a female washer, while the rigid nut is of the male type. Figs. 10, 11, 12 and 13 illustrate a rigid washer and rigid nut, both of the male and female type.

The general contour of the washer and nut may be of any form or shape. Whether the washer is resilient or rigid, or whether the washer and rigid nut are of the male or female type, in all the forms the washer 10 is provided with a slot 11 extending from its periphery to its interior bore 12, while in all cases, the rigid nut is provided with a slot 13 extending from its periphery to its interiorly-threaded bore 14. The width of the slot in each is equal to the outside diameter of the threads in the bore of the nut. The slots extend inwardly to the center of the washer and nut as best shown in Figs. 2, 3, 4, 6, 12 and 13.

The form of washer shown in Figs. 1 to 9 inclusive is, as above stated, constructed by a stamping operation from a flat sheet or piece of resilient metal, and, in its finished form, comprises an axially extending body portion 15 with a curved outward extending peripheral flange 16, and may be designated as a male type of washer, as the axially extending portion 15, when secured in place, intermeshes with the rigid male nut 17.

In the particular form shown in Figs. 7 and 9, the radially extending portion of the resilient washer tapers inwardly from the peripheral flange, while the inner surface or inner wall of the collar 18 integrally formed on the rigid nut 17 is tapered or flared outwardly from the bore in the nut 17, as best shown in Fig. 7. In addition, the resilient washer shown in Figs. 7 and 8 is provided with a plurality of slots 19 in its peripheral flange, and a plurality of slots 20 in its body portion, as a result of which when the rigid nut is applied and screwed home, the beveled or tapering surface of its collar engages the exterior tapering surface of the body portion of the washer and causes the opening in the washer to constrict, and the edges of the opening to engage and intermesh with the threads on the screw-threaded bolt or shaft 21, and thus lock the rigid nut against further turning or movement in one direction. It will be further noted as the nut is thus secured in place the nut and washer are caused to intermesh.

In the form shown in Fig. 9, the resilient washer is likewise stamped from a flat piece or sheet of resilient metal, and, in its finished form, is provided with a resilient collar 22, a radially extending resilient flange 23, and a female socket 24, and a rigid slip-on nut is integrally provided with an axially extending collar 25 which, when the nut is secured in place, intermeshes with the resilient washer there shown.

In Fig. 10, the washer shown is of a rigid construction and of the male type, and is integrally provided with a collar adjacent to its bore which intermeshes with a complementary rigid nut as there shown.

Fig. 11 shows the same type of slip-on securing device as shown in Fig. 10, except that in Fig. 11, the nut is of a male type and is integrally provided with a collar which intermeshes with the female washer as there shown.

In the foregoing description, it will be appreciated that I have provided a slip-on interlocking securing device comprising in combination a slip-on washer and nut which possess to the fullest extent the various objects heretofore pointed out, as well as other inherent advantages.

Having thus described my invention, I claim:

1. A slip-on interlocking washer and nut securing device adapted to be transversely slipped on to a screw-threaded bolt or shaft comprising in combination a washer member and an opposed nut member, each of said washer and nut having an arcuate bore, the bore of said nut being screw-threaded, and each having an open slot extending from the outer peripheral edge to the center thereof, one of said members having in one face thereof an arcuate socket of more than 180° extending from one edge of the slot to the opposite edge, and rigid arcuate extending means of more than 180° on the complementary face of the other member adapted to rotate in said socket and to interlock therewith to prevent the transverse separation of said washer and nut when rotated into locked position.

2. A slip-on interlocking washer and nut securing device adapted to be transversely slipped on to a screw-threaded bolt or shaft comprising in combination a resilient washer, an opposed nut, each of said washer and nut having an arcuate central bore, and each having an open slot extending from the outer peripheral edge to the center thereof, an arcuate female socket of more than 180° in the opposed face of said nut extending from one edge of the slot to the opposite edge, and resilient, arcuate extending means of more than 180° formed in the opposed face of said washer adapted to rotatably intermesh with the arcuate female socket in said nut to prevent the transverse separation of said washer and nut when rotated into locked position.

FRANK L. ROXS.